United States Patent
Auer et al.

(10) Patent No.: US 8,080,230 B2
(45) Date of Patent: Dec. 20, 2011

(54) FINE-PARTICULATE LEAD ZIRCONIUM TITANTES ZIRCONIUM TITANATE HYDRATES AND ZIRCONIUM TITANATES AND METHOD FOR PRODUCTION THEREOF

(75) Inventors: Gerhard Auer, Krefeld (DE); Horst Günnel, Kempen (DE); Frank Hipler, Dortmund (DE); Michael J. Hoffman, Karlsruhe (DE); Susanne Wagner, Karlsruhe (DE); Hans Kungl, Heidelberg (DE)

(73) Assignee: Tronox Pigments GmbH, Krefeld (DE)

( * ) Notice: Subject to any disclaimer, the term of this patent is extended or adjusted under 35 U.S.C. 154(b) by 187 days.

(21) Appl. No.: 11/792,971

(22) PCT Filed: Dec. 13, 2005

(86) PCT No.: PCT/EP2005/013341
§ 371 (c)(1),
(2), (4) Date: Mar. 17, 2008

(87) PCT Pub. No.: WO2006/063784
PCT Pub. Date: Jun. 22, 2006

(65) Prior Publication Data
US 2009/0060831 A1 Mar. 5, 2009

(30) Foreign Application Priority Data
Dec. 13, 2004 (EP) .................................... 04029439

(51) Int. Cl.
*C01G 23/00* (2006.01)
(52) U.S. Cl. .................. 423/598; 423/594.12; 423/619; 501/22; 501/23; 501/102; 501/134; 252/62.9 PZ; 252/520.2
(58) Field of Classification Search .................. 423/603, 423/602, 598, 594.8, 594.12, 619; 501/23, 501/22, 102, 134; 252/62.94 PZ, 520.2, 62.4 PZ
See application file for complete search history.

(56) References Cited

U.S. PATENT DOCUMENTS

| | | | | |
|---|---|---|---|---|
| 3,632,527 A | * | 1/1972 | Alpert | 430/88 |
| 4,350,613 A | * | 9/1982 | Nishino et al. | 502/200 |
| 4,626,369 A | * | 12/1986 | Walker, Jr. | 252/62.9 PZ |
| 5,468,463 A | * | 11/1995 | Butje et al. | 423/612 |
| 6,391,276 B1 | * | 5/2002 | Suda et al. | 423/598 |
| 6,592,805 B1 | * | 7/2003 | Wang et al. | 264/614 |
| 2001/0054859 A1 | * | 12/2001 | Hammer et al. | 310/363 |
| 2002/0115894 A1 | * | 8/2002 | Weisbeck et al. | 568/959 |
| 2002/0135971 A1 | | 9/2002 | Nakaya et al. | |
| 2003/0030249 A1 | * | 2/2003 | Lammer | 280/602 |
| 2003/0035611 A1 | * | 2/2003 | Shi | 385/16 |
| 2003/0096696 A1 | * | 5/2003 | Nada et al. | 501/134 |

FOREIGN PATENT DOCUMENTS

| | | |
|---|---|---|
| JP | 01009818 A | 1/1989 |
| JP | 01009818 A2 | 1/1989 |
| JP | 01009819 A | 1/1989 |
| JP | 01009818 A2 | 4/1989 |
| JP | 06 144835 | 5/1994 |
| JP | 06144835 A | 5/1994 |
| JP | 2000290016 A | * 10/2000 |
| JP | 2002114519 A | * 4/2002 |
| WO | 02062724 A2 | 8/2002 |
| WO | WO 02/062724 A | 8/2002 |

OTHER PUBLICATIONS

Corriu et al., Non-hydrolytic sol-gel process: zirconium titanate gels, 1997,Universite Montpellier, case 007, pp. 279-284.*
Zhang et al., Formation of crystalline nanosized titania in reverse micelles at room temperature, Oct. 9, 2002, Journal of Materials Chemistry, 12, pp. 3677-3680.*
Das et al., Low-Teperature Preparation of nanocrystalline Lead Zirconate Titanate and Lead Lanthanum Zirconate Titanate Powders Using Triethanolamine, 1998, J.Am. Ceram. Soc. , 81, 12, 3357-3360.*
M. Oledzka, M. Lencka, P. Pinceloup, K. Mikulka-Bolen, L. McCandlish, R. Riman: "Influence of Precursor on Microstructure and Phase Composition of Epitaxial Hydrothermal PbZr0.7Ti0.303 Films" Chem Mater, vol. 15, 2003, pp. 1090-1098, XP002369626, International Preliminary Examination Report of PCT.
Zhang Shu-xia, Li Jian-bao, Cao Jun, Zhang Bo, Zhai Hua-zhang, "Effect of $TiO_2$ Content on the Densification, Microstructure and Dielectric Properties of $Zr_xTi_{1-x}O_2$ Microwave Dielectric Ceramics." The Chinese Journal of Process Engineering. Oct. 2001, pp. 387-381, vol. 1 No. 4.
Mu Guohong, Yang Shiyuan, Zhang Fuping, Cai Lingcang, "Progress in Synthesis of PZT Piezoelectric Ceramic Powder." China Ceramics. Aug. 2003, pp. 10-13, vol. 39 No. 4.
Zhang Yan-yu, Du Jin-mei, Yuan Wan-zong, "Phase Transformation on PZT-95/5 Ceramics with Low Density Under Hydrostatic Pressure." Chinese Journal of High Pressure Physics. Dec. 2002, pp. 291-296, vol. 16 No. 4.
Oledzka, Magdalena, et al. "Influence of Precursor on Microstructure and Phase Composition of Epitaxial Hydrothermal PbZr0.7Ti0.3O3 Films." Chem. Mater. 2003. vol. 15, No. 5. 1090-1098. American Chemical Society.
Lee, Burtrand and Sridhar Komarneni. "Chemical Processing of Ceramics." 2nd ed. Baco Raton, Florida: CRC Press, Taylor & Francis Group, 2005. 139-141.
Gajbhiye, N. S. et al. "Characterization of Nanostructured PZT Prepared by Chemical Routes." Journal of Nanoscience and Nanotechnology. 2007. vol. 7, No. 6. 1975-1979. American Scientific Publishers. United States.
Zhang Shu-Xia, et al. "Effect of TiO2 Content on the Densification, Microstructure and Dielectric Properties of ZrxTi1-xO2 Microwave Dielectric Ceramics." The Chinese Journal of Process Engineering. 2001. vol. 1, No. 4. 1-6.
Mu Guohong, et al. "Progress in Synthesis of PZT Piezoelectric Ceramic Powder." China Ceramics. 2003. vol. 39, No. 4. 7-16.
Zhang Yan-Yu et al. "Phase Transformation of PZT-95/5 Ceramics with Low Density under Hydrostatic Pressure." Chinese Journal of High Pressure Physics. 2002. vol. 16, No. 4. 17-26.

* cited by examiner

*Primary Examiner* — Jerry Lorengo
*Assistant Examiner* — Pritesh Darji
(74) *Attorney, Agent, or Firm* — Timothy J. Monahan; Monahan & Moses, LLC

(57) ABSTRACT

The invention relates to fine-particulate zirconium titanates or lead zirconium titanates and a method for production thereof by reaction of titanium dioxide particles with a zirconium compound or a lead and zirconium compound. The titanium dioxide particles have a BET surface of more than 50 m²/g. The lead zirconium titanates can be used for the production of microelectronic components.

29 Claims, No Drawings

FINE-PARTICULATE LEAD ZIRCONIUM TITANTES ZIRCONIUM TITANATE HYDRATES AND ZIRCONIUM TITANATES AND METHOD FOR PRODUCTION THEREOF

The invention relates to fine-particulate lead zirconate titanates (PZT), zirconium titanium hydrates (ZTH) and zirconium titanates as precursors for lead zirconate titanates, as well as to a method for the production thereof by reacting titanium dioxide particles with a zirconium compound or a lead and zirconium compound. The invention furthermore relates to a microelectronic component containing a lead zirconate titanate.

PRIOR ART

Lead zirconate titanate (PZT) exhibits ferroelectric material behaviour. PZT ceramics are therefore frequently used in electromechanical components, for example in so-called sensors for measuring or registering mechanical forces and/or oscillations or as actuators for generating mechanical effects by electric control.

PZT powder is generally produced from the raw materials of lead oxide, zirconium dioxide and titanium dioxide. The formula for the composition of common PZT ceramic materials can be specified as $Pb(Zr_xTi_{1-x})O_3$ with $0<x<1$. Furthermore, certain amounts of doping elements are normally contained (mostly about 1-3% in total). Typical doping elements are lanthanum, neodymium, strontium, potassium, iron, gadolinium and niobium.

Starting materials for such PZT ceramics are calcined PZT mixed oxide powders that are pressed into moulded bodies or processed into coatings or films and then sintered to form a ceramic. Lead zirconate titanate mixed oxide powders can be produced using synthesis methods that proceed by way of solid-state reactions (mixed oxide methods) and using wet chemical methods (for example the sol-gel process, coprecipitation methods or spray reaction methods).

The sinterability and/or sintering temperature of the powder is not only dependent on the composition but also on the past history of the respective material, i.e. on the degree of activation, the particle size and particle size distribution, the particle shape and the density of the green body (i.e. after shaping and before sintering).

In the case of powders produced according to conventional methods, calcination of the starting powder (mixed crystal formation) is carried out at relatively high reaction temperatures in order to obtain almost phase-pure PZT mixed crystals. However, the high calcination temperatures reduce the sintering activity of the PZT mixed crystals.

In order to produce a PZT ceramic having a relative density of approximately 98% from these powders, relatively high sintering temperatures therefore often have to be used.

When using oxidic reactants, the reaction temperatures (calcination temperatures) are approximately 800 to 900° C., when using reactants produced according to the sol-gel method, they are in the range of 450 to 700° C. The corresponding sintering temperatures are approximately 1100 to 1250° C. (oxidic reactants) and <1000° C. (reactants from the sol-gel method). However, at temperatures of clearly more than 1000° C., noticeable amounts of lead oxide evaporate, which is why precautions have to be taken to avoid a loss of lead and thus the disturbance of the stoichiometry. Furthermore, Ag/Pd (70/30) is normally used as the electrode material for ferroelectric ceramics, such as, for example, multi-layer piezoactuators, and thus the sintering temperature is limited by the melting point of this alloy (Ts=1165° C.). Sintering temperatures higher than 1150° C. therefore require a correspondingly higher proportion of the higher-melting but more cost-intensive palladium. The multi-layer piezoactuators consist of ferroelectric ceramic layers arranged in stacks and having a layer thickness of approximately 10 to 200 μm. An approximately 1 to 3 μm thick metal electrode is disposed between each ceramic layer, which serves to control the actuator. These multilayer piezoactuators ideally have relatively high Curie temperatures, and thus applications at higher temperatures are also possible. They are furthermore characterised by high piezoelectric and electromechanical characteristic values and fatigue resistance.

SUMMARY OF THE INVENTION

The object of the present invention is to produce fine-particulate, sinter-active, easily processable and economically producible lead zirconate titanates, zirconium titanium hydrates as well as zirconium titanates as precursors for lead zirconate titanates, from which PZT ceramics can be produced that densify well at low sintering temperatures. A method for the production thereof using simple titanium-containing substrates is furthermore to be provided, with a simple and economic manufacturing process being used.

The object is solved according to the invention on the one hand by a method for the production of zirconium titanates, zirconium titanium hydrates and/or lead zirconate titanates by reacting fine-particulate titanium dioxide particles having a specific surface area of more than 50 m²/g with a zirconium compound or a lead and zirconium compound.

The object is furthermore solved by providing zirconium titanium hydrates, zirconium titanates and lead zirconate titanates, which can be produced by means of the method according to the invention.

The invention furthermore includes the provision of a microelectronic component, in particular a PZT multi-layer actuator, produced using a lead zirconate titanate material according to the invention.

DETAILED DESCRIPTION OF THE INVENTION

The Titanium Dioxide Particles

The fine-particulate titanium dioxide particles used according to the invention have a BET surface area of more than 50 m²/g, preferably of less than 450 m²/g, particularly preferred of 200 to 380 m²/g and especially preferred of 250 to 350 m²/g. The BET surface area is determined in accordance with DIN ISO 9277 by means of $N_2$ at 77 K on a sample of the titanium dioxide particles outgased and dried at 140° C. for 1 hour. Evaluation takes place by way of multi point determination (10-point determination).

The titanium dioxide particles used according to the invention are often titanium oxide hydrate particles, i.e. the particles contain chemisorbed water and optionally $SO_4$ and/or other inorganic and/or organic components.

The titanium dioxide particles preferably contain 0.4 to 25% by weight, particularly preferred 2 to 10% by weight, of water.

The $SO_4$ content of the titanium dioxide particles is preferably less than 1% by weight, particularly preferred between 0.01 and 0.4% by weight, especially preferred between 0.01 and 0.08% by weight, based on $TiO_2$.

The weight percentage details of the components of titanium dioxide as already specified and all of those mentioned below relate to a sample dried in accordance with ISO 787 part 2. The H₂O content of the titanium dioxide particles can be determined according to the following equation:

$$\text{H}_2\text{O content (\%)} = \text{loss on ignition (\%)} - \text{H}_2\text{SO}_4 \text{ content (\%)}$$

In this case, the loss on ignition is the weight loss of a sample dried in accordance with ISO 787 part 2 after baking at a temperature of 1000° C. for one hour. The SO₄ content is determined on the basis of the analytical determination of the sulphur content of the sample dried in accordance with ISO 787 part 2. The sulphur content is determined by combustion and gas-chromatographic detection of the combustion gases by means of thermal conductivity detection (TCD).

The H₂O content of the titanium dioxide particles can also be approximately equated with the loss on ignition following baking for one hour at 500° C. of the sample dried in accordance with ISO 787 part 2.

The H₂O content of the titanium dioxide particles can be precisely determined, for example, by means of the gas-chromatographic analysis of the volatile components which result following baking for one hour at a temperature of 1000° C. of a sample dried in accordance with ISO 787 part 2.

The halide content of the titanium dioxide particles used according to the invention is preferably less than 1000 ppm, particularly preferred less than 500 ppm, especially preferred less than 50 ppm, based on TiO₂. In particular, the chloride content of the particles is preferably less than 200 ppm, in particular less than 100 ppm, especially preferred less than 20 ppm, based on TiO₂.

The niobium content of the titanium dioxide particles can be 10 to 2000 ppm, preferably 30 to 500 ppm, particularly preferred 50 to 300 ppm, especially 50 to 120 ppm, based on TiO₂.

The sodium and/or potassium content of the titanium dioxide particles used according to the invention is preferably less than 200 ppm, particularly preferred less than 50 ppm, based on TiO₂.

The iron content of the titanium dioxide particles used according to the invention is preferably less than 100 ppm, particularly preferred less than 10 ppm, based on TiO₂. The titanium oxide hydrate particles used according to the invention can be obtained by hydrolysing inorganic or organic titanium compounds. The titanium dioxides obtained therefore have different properties depending on the titanium compound and the reaction conditions.

The titanium oxide hydrate particles used according to the invention can be produced with a good quality and cost-effectively by hydrolysing titanyl sulphate solution. However, the titanium oxide hydrate particles can also be produced from titanium tetrachloride or titanium alkoxide.

Titanium oxide hydrate obtained by hydrolysing titanyl sulphate solution has a particularly advantageous combination of properties, namely a high specific surface area and a microcrystalline anatase structure. This anatase structure can be identified as a microcrystalline material owing to the broad reflexes of the x-ray diffractogram (see Fig. 1).

The particles used according to the invention therefore preferably contain less than 10% by weight, particularly preferred less than 1% by weight of rutile, based on TiO₂. Particularly preferred are titanium dioxide particles that clearly exhibit an anatase structure in the x-ray diffractogram.

The titanium oxide hydrate particles can be obtained, for example, by hydrolysing a titanyl sulphate solution that contains sulphuric acid. Depending on the origin and composition of the sulphuric acid-containing titanyl sulphate solution, a sulphuric acid suspension of titanium oxide hydrate is obtained upon hydrolysis, which can still contain undesirable impurities, in particular heavy metals. One or more purification steps are therefore generally carried out in order to free the titanium oxide hydrate of undesirable impurities.

Preferably used are titanium oxide hydrate particles which are formed by hydrolysing titanyl sulphate that is accumulated in the production process for titanium dioxide according to the sulphate method. This process is described, for example, in Industrial Inorganic Pigments, 3$^{rd}$ edition, editors Gunter Buxbaum, Gerhard Pfaff, Wiley-VCH, 2005.

It is particularly preferred for the titanium oxide hydrate obtained after hydrolysis to thereby be freed from adhering impurities by filtering and washing it and optionally also subjecting it to the method step of so-called bleaching, i.e. a chemical treatment with reducing agents to eliminate trivalent iron.

Commercial production of titanium oxide hydrate based on the sulphate method for the production of titanium dioxide also has the advantage of a consistent product quality and constant availability.

In order to obtain a particularly high level of purity, it is advantageous to use not the commercial titanyl sulphate solution containing metal ions and sulphuric acid but rather a synthetic sulphuric acid-containing titanyl sulphate solution which only contains small amounts of impurities. Such a titanyl sulphate solution can be produced, for example, by hydrolysing high-purity TiCl₄ or titanium esters and dissolving the precipitate obtained with sulphuric acid. The production of a high-purity titanium oxide hydrate herefrom can take place either in the same manner as conventional commercial processes or with specific deviations.

The adhering sulphuric acid is preferably removed by reaction with a base (for example NaOH, KOH, NH₃) and subsequent washing out of the sulphate formed. Subsequent elimination of the cations introduced owing to the reaction with the base can optionally be accomplished by reaction with acids that can be easily thermally decomposed (for example carboxylic acids or nitric acid) and subsequent washing out.

The reactions described above may be repeated several times depending on the desired level of purity.

Particular advantages of the titanium oxide hydrate obtained from titanyl sulphate are its high purity as regards iron and other heavy metals as well as its extremely low chloride content.

It may be advantageous to treat the titanium dioxide particles by way of a calcination or heat-treatment step in order to modify the particle size and reactivity in a targeted manner. In particular, the conversion of microcrystalline titanium oxide hydrate into slightly larger anatase crystallites may be advantageous. In this regard, the calcination or heat-treatment step should, however, be carried out such that the particular properties of the titanium oxide hydrate are not lost, i.e. the proportion of chemisorbed water (for example in the form of hydroxyl groups) should not become less than 0.4% by weight, preferably 2.0% by weight, in order to maintain a titanium oxide hydrate surface area that is as reactive as possible.

The reactivity drops significantly in titanium oxide hydrate calcined at high temperatures, whilst the titanium oxide hydrate transforms into macrocrystalline TiO₂ having a crystal size of greater than 100 nm in the anatase or rutile modification with a chemisorbed water content of less than 0.4% by weight. Furthermore, as already mentioned above, coarser titaniferous particles cause the formation of a coarser zirconium titanate or lead zirconium titanate.

According to the invention, titanium oxide hydrate particles are preferably used which, after baking for one hour at a temperature of 1000° C. of a sample pre-dried according to ISO 787 Part 2, have a loss on ignition of greater than 2% by weight, preferably greater than 6% by weight, and/or which, after baking for one hour at 500° C., have a loss on ignition of greater than 0.8% by weight, preferably greater than 1.2% by weight.

Primary particles of the titanium oxide hydrate having an average particle size of 3 to 15 nm, preferably 4 to 8 nm, are obtained by means of the method steps described according to the invention, as a result of which a production process that is improved both technically and economically as compared to conventional gas phase processes is provided for the formation of nanoparticulate materials containing titanium oxide hydrate.

The primary particles are small, approximately spherical, microcrystalline particles with a lattice-distorted anatase structure. The particle size can be determined by calculation from the BET surface area assuming a monomodal particle size distribution of spherical particles. Provided that there is a monomodal particle size distribution and spherical particles, the relationship between the average particle size d and the specific surface area $S_{BET}$ (determined according to BET) is given by the equation $$d_{particle} = \frac{6}{\rho \cdot S_{BET}}$$

wherein $S_{BET}$ is in m$^2$/g, $\rho$=density of the particle in g/cm$^3$ and d is in μm. The densities used are: 3.90 g/cm$^3$ (for TiO$_2$ as titanium oxide hydrate or anatase), 4.26 g/cm$^3$ (for TiO$_2$ as rutile).

It was surprisingly found that in combination with zirconium compounds, in particular fine-particulate hydroxidic zirconium compounds, the titanium dioxide particles used according to the invention have clear advantages as regards their suitability for the production of zirconium titanates or lead zirconate titanates as compared to conventional titanium dioxide, such as commercially available technical titanium dioxides having average particle sizes of approximately 200 nm. Thus, particularly fine-particulate and sinter-active zirconium titanates or lead zirconate titanates are obtained presumably owing to the high specific surface area, the small particle size of the titanium oxide hydrate and the high reactivity during reaction with a zirconium compound, in particular with fine-particulate hydroxidic zirconium compound or a lead compound and a fine-particulate hydroxidic zirconium compound.

Furthermore, the low chloride content of the titanium oxide hydrate particles according to the invention has a positive effect on the properties of the zirconium titanates or lead zirconate titanates. The low content of chloride and metallic trace elements has a favourable effect on the properties of the zirconium titanates or lead zirconate titanates produced from titanium oxide hydrate. The presence of halides is disruptive particularly at low reaction temperatures to form zirconium titanate or lead zirconate titanate.

The Zirconium and Lead Compounds

The titanium dioxide particles are reacted according to the invention with one or more zirconium compounds or lead and zirconium compounds. These are generally oxides or salts of lead or zirconium. The salts include acetates, carbonates, oxalates, hydroxides, oxide chlorides, oxide sulphates, nitrates, halides such as chlorides, as well as organic compounds such as alkoxides and salts of carboxylic acids.

Particularly preferred are fine-particulate oxidic or water-soluble zirconium and lead compounds. It is particularly preferred for zirconium oxide (ZrO$_2$), zirconyl chloride (ZrOCl$_2$) and zirconyl sulphate (ZrOSO$_4$) to be used as zirconium compounds. Of the lead compounds, lead oxide (PbO), lead nitrate (Pb(NO$_3$)$_2$), lead acetate (Pb(OAc)$_2$) as well as other easily decomposable lead compounds or mixtures hereof are particularly preferred.

The decomposition temperatures can, for example, be determined in combined thermogravimetry (TG) and differential thermal analysis (DTA) equipment.

The use of zirconium compounds used in the form of a precipitate having a BET surface area of more than 20 m$^2$/g, preferably of more than 50 m$^2$/g, particularly preferred of more than 100 m$^2$/g, that is obtained by neutralizing an aqueous zirconium salt solution has proven to be particularly advantageous. The precipitate is preferably precipitated on the titanium dioxide particles.

The BET surface area is determined, as is the case for the titanium dioxide particles, in accordance with DIN ISO 9277 by means of N$_2$ at 77K on a sample of the precipitate outgassed and dried at 140° C. for 1 hour.

Such a precipitate can contain one or more of the compounds zirconium hydroxide, zirconium oxyhydroxide or zirconium oxide.

Conduction of the Reaction

The titanium dioxide particles characterised above are used according to the invention in a method for the production of zirconium titanates or lead zirconate titanates with the zirconium compounds or lead and zirconium compounds referred to above.

In order to produce zirconium titanates, the titanium dioxide particles and zirconium oxide or zirconium hydroxide can be dry milled together and then calcined or partially calcined. Lead zirconate titanates can accordingly be produced by the milling together of titanium dioxide particles, zirconium oxide or zirconium hydroxide and a lead compound, for example lead oxide, lead nitrate or lead acetate. Calcination or partial calcination can optionally follow in this case as well.

The titanium dioxide particles can alternatively also be reacted with a water-soluble zirconium compound (for example zirconyl chloride or zirconyl sulphate), whereby the particles are suspended in the already produced Zr-containing or Zr- and Pb-containing solution or in water together with the Zr salt or Zr and Pb salt. The reaction takes place by neutralizing the suspension, for example by adding ammonia or sodium hydroxide, the zirconium compound precipitating in the form of oxidic and/or hydroxidic compounds. Neutralisation is preferably carried out until a pH value of 7 to 8 has been reached.

The mixture obtained in this manner can be separated by way of filtration and then optionally washed and dried to obtain a powdery material consisting of titanium dioxide and precipitated oxides and/or hydroxides of zirconium or consisting of titanium dioxide and precipitated oxides and/or hydroxides of zirconium and lead.

The obtained mixture can be subjected either to wet milling, preferably bead milling, before drying or to dry milling after drying, by means of which the calcination and/or sintering activity can be improved even further.

Following separation and purification of the product by means of filtration and washing, the product that is low in chloride and sulphate is dried. Drying can optionally be followed by calcination or partial calcination at a maximum temperature of 650° C., preferably at a maximum of 600° C. It is particularly preferred for calcination or partial calcination to take place at a temperature of less than 500° C., particularly preferred of less than 400° C. If the reaction is carried out in the presence of a lead compound and/or other doping compounds such as, for example, lanthanum or niobium compounds, correspondingly doped or non-doped lead zirconate titanate is obtained following calcination.

However, production of the lead zirconate titanates can also have two steps, with the zirconium titanates being produced in one of the manners described above in the first step and these then being milled with a lead compound in a liquid medium in a second step. Calcination at a maximum temperature of 650° C., preferably at a maximum of 600° C., can also follow drying in this case.

The zirconium titanate or lead zirconate titanate can also be directly obtained under hydrothermal conditions by reacting the titanium dioxide particles with a zirconium compound or a lead and zirconium compound.

In the method for producing lead zirconate titanate, the exact Zr/Ti ratio desired can be adjusted by mixing two homogeneous zirconium titanium hydrate educts with a different Zr/Ti ratio, with the lead compound and the doping components also being added to this mixture. The exact Pb/Zr/Ti ratio desired can, however, also be adjusted by mixing two homogeneous zirconium titanium hydrate educts with a different Zr/Ti ratio as well as a third educt also containing the lead compound in addition to zirconium titanium hydrate, and the doping components are also added to this mixture.

Calcination of the titanium dioxide particles with the zirconium compound or lead and zirconium compound preferably takes place not isothermally, but rather at an approximately constant conversion rate to zirconium titanate or lead zirconate titanate (SCRT method, described for $BaTiO_3$ in Gotor et al., J. Europ. Cer. Soc. 23 (2003), 505-513).

Following calcination, the zirconium titanate or lead zirconate titanate can be further reduced in size by means of milling, for example bead milling.

A specific energy input of preferably a maximum of 80 kWh per tonne of solid, preferred of less than 30 kWh per tonne, is used in the milling following calcination.

The further processing following calcination can, however, also take place entirely without an intermediate milling step.

Sintering takes place following calcination preferably at a maximum temperature of 1050° C., particularly preferred below 950° C.

Calcination and sintering can also take place in a single step in the form of "reaction sintering".

A relative density of at least 97%, particularly preferred of at least 98.5%, is preferably achieved during sintering.

The powdery lead zirconate titanates or zirconium titanates according to the invention are fine particulate, have a low degree of agglomeration, are reactive and have a very homogeneous distribution of the individual elements.

The quantity ratios of lead compound/zirconium compound/titanium dioxide particles (and optionally other doping elements) are adjusted by means of precision weighing. The molar ratio Pb:Zr:Ti can thereby be adapted depending on the specific application requirement of the lead zirconate titanate or zirconium titanate. If the compounds according to the invention are used, the method step of milling following calcination can be dispensed with either entirely or partially owing to the low calcination temperatures and the low degree of agglomeration of the PZT particles obtained. This represents a considerable cost advantage as compared to the conventional method.

It is furthermore possible to convert the starting materials into the finished ceramic in a single method step (reaction sintering) instead of conducting the method in the normal manner (calcination, milling, sintering). This method is characterised by clear costs advantages.

During sintering of the lead zirconate titanates according to the invention, densification already occurs at lower temperatures than is the case with conventional powders. Ceramics made of these materials can thereby be produced at lower sintering temperatures. Alternatively, owing to the improved densification behaviour as compared to a conventional powder, ceramics having higher densities can be produced at the same sintering temperatures.

The structures of the ceramics made from the lead zirconate titanates according to the invention have a very fine-grain. The low grain sizes are advantageous for the production of components having very low dimensions. Since, with a smaller grain size, a given volume has a larger number of grains with different crystallographic orientations, the local inhomogeneities caused by the anisotropic properties of the materials are reduced. In the case of low grain sizes, the coercitive field strengths are high and the field-induced expansions and other electromechanical properties are low. In applications in which the grain sizes are of secondary importance, grain growth can be achieved by means of suitable doping. Grain size and electromechanical properties can be adjusted at a given sintering temperature by way of a suitable combination of donor and acceptor doping. Electric and electromechanical properties can thereby be increased and the coercitive field strengths reduced. Decisive for the grain sizes is the excess of donor.

Preparations of Titanium Oxide Hydrate Particles and Zirconium Compounds or Zirconium and Lead Compounds The invention also provides preparations that contain titanium oxide hydrate particles with a BET surface area of more than 50 $m^2/g$ and a, preferably hydroxidic, compound obtained from a water-soluble zirconium compound or a water-soluble lead and zirconium compound.

Such preparations are preferably in dried form. These are preferably powdery preparations.

It is particularly preferred for a water-soluble zirconium compound or water-soluble lead and zirconium compound or an aqueous solution of a zirconium salt or of a lead and zirconium salt to be added to titanium oxide hydrate or an aqueous suspension of titanium oxide hydrate, for this suspension to be neutralised, filtered and the obtained filter cake washed and dried. A titanium oxide hydrate is thereby obtained, on the surface of which the zirconium compound or the lead and zirconium compound are distributed evenly. The titanium oxide hydrate obtained in this manner, which is coated with or homogeneously mixed with the zirconium compound or the lead and zirconium compound can then be calcined.

It is also possible to carry out drying and calcination in a single method step.

The lead and zirconium compounds are preferably oxidic and/or hydroxidic compounds.

If the preparation contains titanium oxide hydrate particles and a zirconium compound, the titanium/zirconium ratio (molar ratio) is preferably between 0.25 and 4, particularly preferred between 0.66 and 1.00 and especially between 0.75 and 0.9.

In preparations containing titanium oxide hydrate particles as well as a precipitated or deposited zirconium compound and lead compound, the molar ratio [Zr]/[Ti] is preferably 0.25 to 4, particularly preferred 1.00 to 1.50, and the molar ratio [Pb]/([Zr]+[Ti]) is preferably 0.95 to 1.05, particularly preferred 0.95 to 1.0.

When producing the preparations according to the invention as intermediate products for the zirconium titanate or lead zirconate titanate, doping compounds may optionally be added.

Nd—, Sr—, La—, Nb—, Ca—, Na—, K—, Cu—, Ni— or Fe— salts or the corresponding oxides can, for example, be added as doping compounds.

The Zirconium Titanium Hydrate (ZTH), Zirconium Titanate or Lead Zirconate Titanate The invention provides a preparation of zirconium titanium hydrate (ZTH) which can be obtained according to the method of the invention from titanium oxide hydrate particles having a BET surface area of more than 50 m$^2$/g and a zirconium compound, the molar ratio of zirconium and titanium being between 0.25 and 4.

A powdery preparation of zirconium titanium hydrate (ZTH) is preferably provided, with the zirconium compound, preferably as an oxidic and/or hydroxidic compound, being deposited on the titanium oxide hydrate particles and the mixture being subsequently dried.

Owing to this coating of the TiO$_2$ particles with zirconium hydroxide, the reaction of lead with the TiO$_2$ to form lead titanate, which already occurs at low temperatures, can be at least partially repressed or delayed.

The BET surface area of this powdery preparation of zirconium titanium hydrate (ZTH) is preferably more than 50 m$^2$/g, preferred more than 100 m$^2$/g, particularly preferred more than 150 m$^2$/g.

The chloride content of this powdery preparation of zirconium titanium hydrate (ZTH) is preferably less than 100 ppm, particularly preferred less than 30 ppm.

The invention also provides lead zirconate titanates or zirconium titanates as precursors for lead zirconate titanates, which can be obtained from zirconium titanium hydrate (ZTH).

The lead zirconate titanate according to the invention can be described by the empirical formula Pb(Zr$_x$Ti$_{1-x}$)O$_3$ with 0<x<1, preferably 0.4<x<0.8.

The chloride content of the zirconium titanates or lead zirconate titanates is preferably less than 100 ppm, particularly preferred less than 30 ppm and especially preferred less than 10 ppm.

The niobium content of the zirconium titanium hydrates (ZTH) or zirconium titanates is preferably 10 to 300 ppm, particularly preferred 15 to 100 ppm and especially preferred 20 to 50 ppm. The niobium content of the lead zirconate titanates is preferably 1 to 300 ppm, particularly preferred 10 to 300 ppm and especially preferred 5 to 15 ppm.

The zirconium titanium hydrates (ZTH), zirconium titanates or lead zirconate titanates according to the invention furthermore preferably contain less than 1% sulphate, particularly preferred less than 500 ppm and especially preferred less than 200 ppm.

The zirconium titanium hydrates (ZTH), zirconium titanates or lead zirconate titanates according to the invention preferably contain less than 200 ppm, particularly preferred less than 50 ppm, of sodium or potassium.

The zirconium titanium hydrates (ZTH), zirconium titanates or lead zirconate titanates according to the invention preferably also contain less than 20 ppm of iron, preferred less than 5 ppm.

The phase purity of the product according to the invention can be determined by means of powder x-ray diffractometry (XRD).

Sintering of the materials produced on the basis of the powder according to the invention to form ceramics with sufficient densities can take place at a relatively low temperature. Starting from unmilled, calcined PZT powder (undoped with a Zr/Ti ratio of 52.5/47.5), ceramics having relative densities of 95% (sintered in air) can be produced at a sintering temperature of 950° C. The densities that can be achieved at a given sintering temperature can be further increased by using suitable additives.

It is particularly advantageous to mill the titanium dioxide particles according to the invention either alone or together with the zirconium compounds used. Wet milling is preferably used herefor, for example bead milling. An even finer, even more homogeneous and even more reactive material is thereby obtained.

The lead compound and/or other doping components can also be present in this milling step.

Microelectronic Components

The lead zirconate titanates according to the invention can be used to produce a microelectronic component, for example a multi-layer piezoactuator. Owing to the fine-particulate form of the lead zirconate titanates obtained, it is possible to realise particularly thin layers and thus particularly small component dimensions. In particular the use in multi-layer ceramic piezoactuators comes into consideration where, owing to the fine-particulate form of the lead zirconate titanates according to the invention, it is possible to obtain particularly thin layers having a layer thickness of preferably less than 100 μm, particularly preferred of less than 80 to 50 μm, especially preferred of less than 20 μm and most preferred of less than 10 μm. The high sintering activity or low sintering temperature of the lead zirconate titanates according to the invention furthermore enables the use of a low melting and cost-effective electrode material. For example, electrodes made of an Ag/Pd alloy having a higher Ag proportion than normal can be used. In the case of sintering temperatures of below 950° C., it is even possible to use pure Ag electrodes or Cu electrodes (Ts=1083° C.).

Such components can be manufactured, for example, by producing a slip from the lead zirconate titanate optionally together with organic additives and drawing it to form thin films using different methods (for example film casting, doctor-blade methods). Corresponding components can also, following the addition of a pressing agent (for example an organic binding agent) to the lead zirconate titanate, be pressed into a green body that is baked before the sintering process.

It is also possible to use the fine-particulate lead zirconate titanates according to the invention in a mixture with conventional coarser lead zirconate titanates. The microstructure of the resulting ceramic can hereby be influenced in a targeted manner. Therefore, a structure characterised by a specific mixture of small and large grains can be adjusted, which in turn enables a specific property profile.

The sintering activity, for example, can also be increased by adding the fine-particulate material to the conventional material, without the grain size of the sintered ceramic becoming too small overall.

It is also possible to influence the grain size of the sintered ceramic in a targeted manner by means of suitable doping; in particular, the grain size of the sintered ceramic can be increased in a targeted manner at a given sintering temperature by means of doping.

EXAMPLES

The invention is explained in more detail below by means of several selected examples, however the invention is in no way restricted to these examples.

Example 1a

Titanium oxide hydrate (8% by weight of volatile components, anatase, BET: approx. 300 m$^2$/g, corresponding to a crystallite size of 6 nm; analytic information based on $TiO_2$: 700 ppm S, 89 ppm Nb, 12 ppm Fe) is suspended in water and mixed with an aqueous zirconyl chloride solution. The quantity ratios of the reactants are selected such that the molar ratio of Zr to Ti is 0.525 to 0.475.

By adding ammonia solution until a pH of 7.8 is reached, the dissolved zirconium is precipitated on the titanium oxide hydrate particles. The suspension is filtered, washed and the obtained filter cake is dried.

Example 1b

Zirconyl chloride solution is added to an aqueous suspension of titanium oxide hydrate, which is obtained during the production of titanium dioxide according to the sulphate method after the method step of bleaching (microcrystalline anatase, approx. 7% by weight of sulphate based on $TiO_2$, BET: approx. 300 $m^2/g$, corresponding to a crystallite size of 6 nm). The quantity ratios of the reactants are selected such that the molar ratio of Zr to Ti is 0.525 to 0.475.

By adding ammonia solution until a pH of 7.8 is reached, the dissolved zirconium is precipitated on the titanium oxide hydrate particles. The suspension is filtered, washed and the obtained filter cake is dried.

Example 1c

Zirconyl chloride solution and ammonia solution are simultaneously added to an aqueous suspension of titanium oxide hydrate, which is obtained during the production of titanium dioxide according to the sulphate method after the method step of bleaching (microcrystalline anatase, approx. 7% by weight of sulphate based on $TiO_2$, BET: approx. 300 $m^2/g$, corresponding to a crystallite size of 6 nm), the dissolved zirconium thereby being precipitated on the titanium oxide hydrate particles.

During the addition phase, the suspension is kept in a pH range of 6 to 8 and once the entire amount of zirconyl chloride solution has been added, it is adjusted with ammonia to pH 7.8. The quantity ratios of the reactants are selected such that the molar ratio of Zr to Ti is 0.544 to 0.456.

The suspension is filtered, washed and the obtained filter cake is spray dried.

The dried zirconium titanium hydrate (ZTH) has the following parameters:

| | |
|---|---|
| Chloride | <20 ppm |
| Niobium | 120 ppm |
| Sulphate | 0.69% |
| Residual moisture | 20.1% |
| Loss on ignition | 26.0% (1 hour at 1000° C.) |
| BET | 396 $m^2/g$ |

Example 1d

The same method as in Example 1c) is used up to the production of the aqueous suspension of titanium oxide hydrate with deposited zirconium.

The suspension is filtered and the obtained filter cake is again mashed with water to form a suspension (approximately 10% solids content). This suspension is milled in two passages in a bead mill (LME 4 of the firm Netzsch) with $ZrO_2$ milling balls (0.4 to 0.7 mm) with a dwelling time of 3 minutes per passage (total dwelling time 6 minutes; energy input approx. 200 kWh/t of solid; temperature increase during milling approximately 19 K). The milled suspension obtained is then spray dried.

The dried zirconium titanium hydrate (ZTH) has the following parameters:

| | |
|---|---|
| Chloride | <20 ppm |
| Niobium | 120 ppm |
| Sulphate | 0.72% |
| Residual moisture | 9.9% |
| Loss on ignition | 18.4% (1 hour at 1000° C.) |
| BET | 251 $m^2/g$ |

Example 2

A powder mixture milled in an attrition mill and dried, which consists of PbO (Alfa AESAR, purity 99.99%), Zr/Ti hydrate (from example 1c) and $La_2O_3$ (doping element, firm Alfa AESAR, purity 99.9%), corresponding to the later stoichiometric composition $Pb_{0.97}La_{0.02}(Zr_{0.525}Ti_{0.475})O_3$, is sieved and then calcined in an oven in air for 2 hours at a temperature of T=400° C. in aluminium oxide crucibles saturated with PbO. During the precision weighing of the Zr/Ti hydrate powder, the moisture content thereof is taken into consideration. Primarily lead zirconate titanate (PZT) is detected in the x-ray diffractogram following calcination.

Example 3

The powder calcined at 400° C. for 2 hours, which was obtained in Example 2, is then milled again in a planetary ball mill for 6 hours. A further drying step and sieving follow milling in isopropanol. The sieved powders are uniaxially pressed into green bodies and then redensified in a cold isostatic press. Sintering of the green body takes place at a temperature of 1050° C. (or 950° C.) and with a holding time of 6 hours in air. In order to avoid too great a loss of PbO, the samples are disposed in a sealed aluminium oxide crucible that is saturated with PbO during the sintering process. The relative densities of the sintered samples are up to 95% at a sintering temperature of 950%; at a temperature of 1050° C., relative densities of 97 to 98% are achieved.

Example 4

Comparative Example

A powder mixture milled in an attrition mill and dried, which consists of PbO (firm Alfa AESAR, purity 99.99%), $ZrO_2$ (firm Tosoh), $TiO_2$ (TR-HP-2 of the firm Kerr-McGee) and $La_2O_3$ (doping element, firm Alfa AESAR, purity 99.9%), corresponding to the later stoichiometric composition $Pb_{0.97}La_{0.02}(Zr_{0.525}Ti_{0.475})O_3$ (cf. Example 2), is calcined in an air oven for 2 hours at 850° C. Following calcination, the powder is milled in isopropanol, dried, sieved and further processed into green bodies by means of uniaxial and cold isostatic pressing. The green bodies are then sintered in air for 6 hours at 950 to 1050° C. The samples are thereby disposed in a sealed $Al_2O_3$ crucible (method see Example 3). The relative densities of the sintered samples are less than 80% at a sintering temperature of 950° C.; the relative density increases to 97% if the sintering temperature is increased to 1050° C.

Example 5

Production of ceramic test bodies is carried out in the same manner as in Example 3 up to the step of calcination, however the powders calcined at 400° C. are then immediately further processed into green bodies, without milling or sieving, by means of uniaxial and cold isostatic pressing and are then sintered.

If the green bodies are sintered at a temperature of 1050° C. and with a holding time of 6 hours in air, a density of 97% of the theoretical density is obtained. If the green bodies are sintered at a temperature of 950° C. and with a holding time of 6 hours in air, a density of 95% of the theoretical density is obtained.

Example 6

A powder mixture milled in an attrition mill and dried, which consists of PbO, Zr/Ti hydrate (from example 1b) and $La_2O_3$ (doping element) is directly processed into green bodies by means of uniaxial and cold isostatic pressing and is then sintered. This means that sintering and calcination occur in a single method step (reaction sintering). The relative densities of the reaction sintered samples are 92%.

Example 7

The dried Ti—Zr hydrate obtained from Example 1d is calcined in a muffle oven for 2 hours at 1250° C. A crystalline zirconium titanate is thereby obtained.

Example 8

An aqueous lead acetate solution and subsequently an aqueous zirconyl sulphate solution are added to an aqueous suspension of titanium oxide hydrate (9% by weight of volatile components, anatase, BET: 271 m$^2$/g, corresponding to a crystallite size of 6 nm; analytic information based on $TiO_2$: 700 ppm S, <20 ppm Cl, 310 ppm Nb, 10 ppm Fe). The quantity ratios of the reactants are selected such that the lead zirconate titanates produced therefrom have a composition corresponding to the formula $Pb_{0.98}(Zr_{0.54}Ti_{0.46})O_3$.

By adding ammonia until a pH of 7.0 is reached, the dissolved compounds are precipitated on the titanium oxide hydrate particles. The suspension is filtered, washed and the obtained filter cake is dried.

Example 9

The material obtained in Example 8 is calcined for 30 minutes at a temperature of 500° C.

$PbTiO_3$ and $PbZrO_3$ are detected in the x-ray diffractogram; the anatase reflexes present before calcination have completely disappeared.

Example 10

Powdery titanium oxide hydrate (composition as in Example 8) is mixed with fine-particulate zirconium oxide and lead oxide and milled. The quantity ratios of the reactants are selected such that the lead zirconate titanates that can be produced therefrom have a composition corresponding to the formula $Pb_{0.98}(Zr_{0.54}Ti_{0.46})O_3$.

The obtained powder mixture converts at lower temperatures into lead zirconate titanate as a similarly produced powder mixture in which a titanium dioxide component having a particle size of 200 nm was used instead of the titanium oxide hydrate.

Example 11

Comparative Example

An aqueous lead acetate solution and subsequently an aqueous zirconyl sulphate solution are added to an aqueous suspension of titanium dioxide in the rutile modification with a particle size of 200 nm and a BET surface area of 6 m$^2$/g. The quantity ratios of the reactants are selected such that the lead zirconate titanates produced therefrom have a composition corresponding to the formula $Pb_{0.98}(Zr_{0.54}Ti_{0.46})O_3$. By adding ammonia until a pH of 7.0 is reached, the dissolved compounds are precipitated on the titanium dioxide. The suspension is filtered, washed and the obtained filter cake is dried.

The material obtained in this manner is calcined for 30 minutes at a temperature of 500° C.

The titanium dioxide has only partially converted at this temperature; clear proportions of rutile in addition to various other phases are still detected in the x-ray diffractogram.

The invention claimed is:

1. Method for the production of lead zirconate titanates, wherein lead and zirconium compounds are reacted with titanium dioxide particles, and wherein the zirconium compounds are used in the form of a precipitate having a BET surface area of more than 50 m$^2$/g and the titanium dioxide particles have a BET surface area in the range of 200 to 380 m$^2$/g.

2. Method according to claim 1, wherein the zirconium compounds are obtained by neutralizing an aqueous zirconium salt solution.

3. Method according to claim 2, wherein the precipitate obtained by neutralizing an aqueous zirconium salt solution contains one or more of the compounds selected from the group consisting of zirconium hydroxide, zirconium oxyhydroxide and zirconium oxide.

4. Method according to claim 2, wherein the precipitate obtained by neutralizing an aqueous zirconium salt solution is precipitated on the titanium dioxide particles.

5. Method according to claim 4, wherein the titanium dioxide particles are titanium oxide hydrate particles.

6. Method according to claim 1, wherein the titanium dioxide particles are reacted in suspension with a water-soluble zirconium compound and a water-soluble lead compound, a dissolved zirconium compound and a dissolved lead compound being neutralized and precipitated by an addition of alkaline compounds.

7. Method according to claim 6, wherein the obtained precipitate is separated by filtration and is optionally then washed and dried such that a powdery mixture comprising titanium dioxide and precipitated oxides and/or hydroxides of the zirconium and lead is obtained.

8. Method according to claim 7, wherein the powdery mixture is calcined or partially calcined at a maximum temperature of 650° C., after drying.

9. Method according to claim 1, wherein the titanium dioxide particles are present in the anatase crystal structure.

10. Method according to claim 8, wherein following calcination, the material is sintered at a maximum temperature of 1050° C., and the sintered material is characterized by a relative density of at least 97%.

11. Method according to claim 7, wherein the powdery mixture is calcined or partially calcined at a maximum temperature of 500° C., after drying, and the material is sintered at a maximum temperature of 950° C., whereby the sintered material is characterized by a relative density of at least 98.5%.

12. Method according to claim 7, wherein the obtained mixture is subjected either to wet milling, preferably bead milling, before drying, or to dry milling, after drying, and the lead zirconate titanate further comprises a doping agent, and after milling, the lead zirconate titanate is formed into a shape suitable for use in a microelectric component, and sintered at a maximum temperature of 1050° C.

13. Method according to claim 12, wherein the lead zirconate titanate is in the form of a layer having a thickness of less than 100 μm.

14. Method according to claim 12, wherein the obtained mixture is calcined or partially calcined after drying at a maximum temperature of 650° C., and is formed into a green body or a film, prior to sintering at a maximum temperature of 950° C.

15. Method according to claim 1, wherein the titanium dioxide particles is obtained by hydrolysing titanyl sulphate and are reacted with a water-soluble zirconium compound without intermediate drying.

16. Method according to claim 15, wherein the titanium dioxide particles have a sulphate content of less than 1% by weight, based on $TiO_2$.

17. The lead zirconate titanate made by the method of claim 1, having a chloride content of less than 100 ppm and a niobium content of 10 to 300 ppm.

18. The lead zirconate titanate of claim 17, wherein the titanium dioxide particles contain less than 1000 ppm of halides, based on $TiO_2$, and a sulphate content of less than 1% by weight, based on $TiO_2$.

19. The lead zirconate titanate of claim 18, wherein the titanium dioxide particles contain less than 200 ppm of sodium, less than 200 ppm of potassium and less than 10 ppm iron, based on $TiO_2$.

20. Method according to claim 7, wherein the obtained mixture is calcined and sintered in a single step in the form of reaction sintering.

21. Method according to claim 1, wherein the titanium dioxide particles are reacted in suspension with a water-soluble zirconium compound and a water-soluble lead compound, a dissolved zirconium compound and a dissolved lead compound being neutralized and precipitated by the addition of alkaline compounds, wherein the precipitate obtained by neutralizing an aqueous zirconium salt solution is precipitated on the titanium dioxide particles, and further wherein the titanium dioxide particles are titanium oxide hydrate particles.

22. Method of claim 21, wherein (a) the obtained mixture is separated by filtration and is optionally then washed and dried such that a powdery material consisting of titanium dioxide and precipitated oxides and/or hydroxides of the zirconium and lead is obtained; (b) the obtained mixture is subjected either to wet milling, preferably bead milling, before drying or to dry milling after drying; and (c) the obtained mixture is calcined or partially calcined after drying at a maximum temperature of 650° C., and further characterized in that the titanium dioxide particles are present in the anatase crystal structure, with less than 10% rutile structure based on $TiO_2$.

23. Method according to claim 21, wherein the titanium dioxide particles are obtained by hydrolysing titanyl sulphate and are reacted with a water-soluble zirconium compound without intermediate drying, and the titanium dioxide particles are present in the anatase crystal structure.

24. Method for the production of zirconium titanates, wherein zirconium compounds are reacted with titanium dioxide particles, and wherein the zirconium compounds are used in the form of a precipitate having a BET surface area of more than 50 $m^2/g$ and the titanium dioxide particles have a BET surface area in the range of 200 to 380 $m^2/g$.

25. Method according to claim 24, wherein the zirconium compounds are used in the form of a precipitate obtained by neutralizing an aqueous zirconium salt solution.

26. Method according to claim 25, wherein the precipitate obtained by neutralizing an aqueous zirconium salt solution is precipitated on the titanium dioxide particles.

27. Method of claim 9, wherein the titanium dioxide particles are titanium dioxide hydrate particles.

28. Method according to claim 24, comprising the steps of forming an aqueous suspension of the titanium dioxide particles and then simultaneously adding an aqueous solution of the zirconium compound and a neutralizing agent, thereby precipitating the zirconium compound on the surface of the titanium oxide particles.

29. A method for the production of lead zirconate titanates, comprising the steps of: (a) forming an aqueous solution comprising (i) a dissolved zirconium compound, (ii) a dissolved lead compound, and (iii) a suspension of titanium dioxide hydrate particles, wherein the titanium dioxide hydrate is in the anatase crystal structure, with less than 10% rutile structure based on $TiO_2$; (b) neutralizing the aqueous solution to cause the zirconium compound and the lead compound to precipitate on the surface of the titanium dioxide hydrate particles; (c) filtering the obtained precipitate; and (d) calcining and sintering the precipitate to form a lead zirconate titanate.

* * * * *